UNITED STATES PATENT OFFICE.

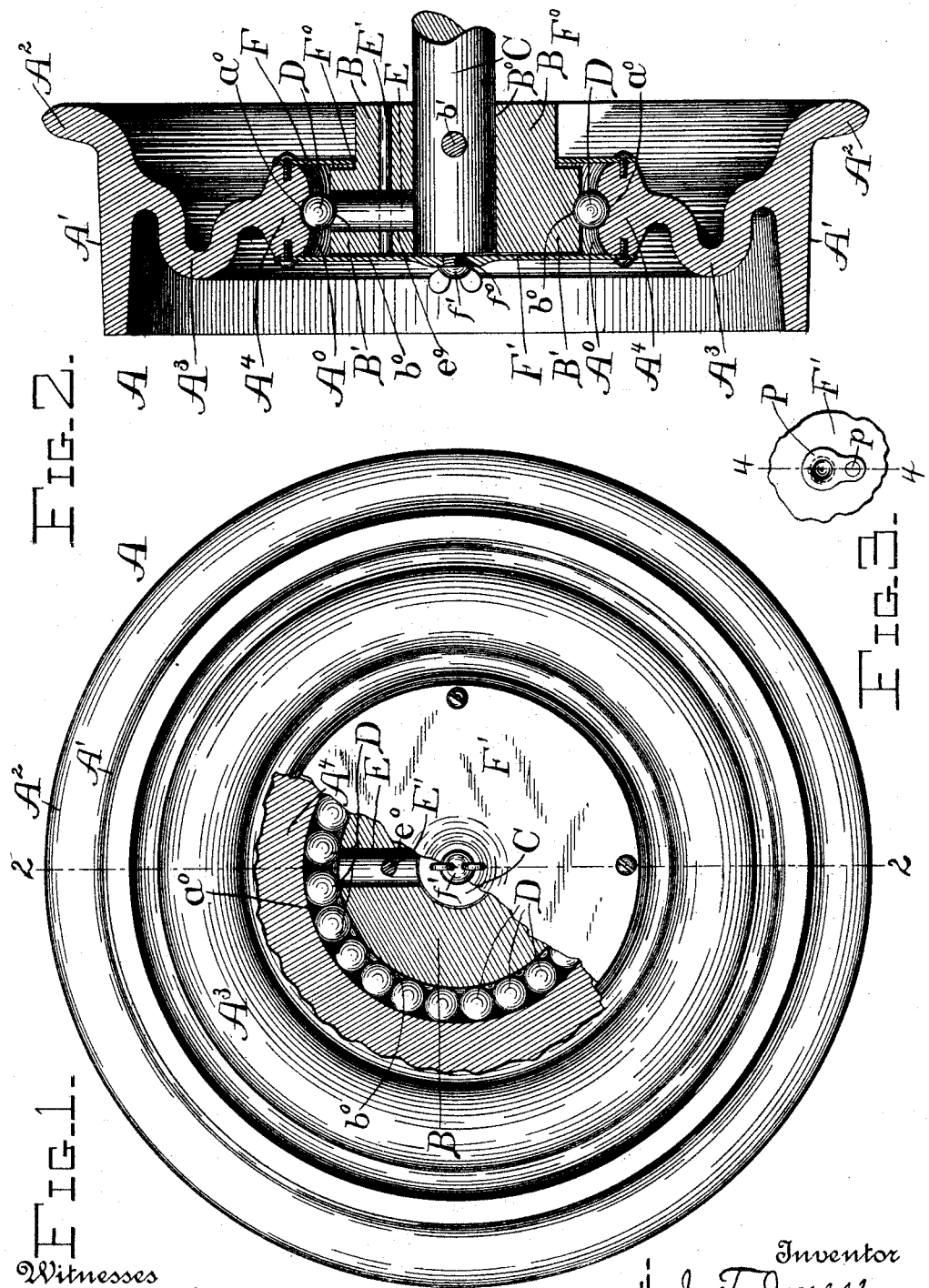

JOHN T. JONES, OF IRON MOUNTAIN, MICHIGAN.

CAR-WHEEL.

SPECIFICATION forming part of Letters Patent No. 585,524, dated June 29, 1897.

Application filed January 5, 1897. Serial No. 618,038. (No model.)

*To all whom it may concern:*

Be it known that I, JOHN T. JONES, a citizen of the United States, residing at Iron Mountain, in the county of Dickinson and State of Michigan, have invented certain new and useful Improvements in Car-Wheels; and I do hereby declare the following to be a full, clear, and exact description of the invention, such as will enable others skilled in the art to which it appertains to make and use the same.

My invention relates to improvements in car-wheels and bearings therefor; and it consists in the novel construction and combination of parts hereinafter described and claimed.

My invention will be understood by reference to the accompanying drawings, wherein the same parts are indicated by the same letters throughout the several views.

Figure 1 represents a side view, partly in section, of a car-wheel constructed according to my invention. Fig. 2 represents a section taken through the car-wheel on the line 2 2 in Fig. 1. Fig. 3 is a detail view showing a spring-plate for covering the oil-opening in the outer plate of the car-wheel instead of the screw shown in Figs. 1 and 2, and Fig. 4 is a section taken on the line 4 4 in Fig. 3.

A represents the wheel proper, having tread portion A' with flange $A^2$ thereon, and having corrugated web $A^3$ with central opening $A^0$ therein, and inclined annular portion $A^4$ surrounding this opening. This inclined annular portion or ring $A^4$, surrounding the central opening $A^0$ in the web, is provided with an internal continuous groove $a^0$, so located as to be equidistant from the two sides of this annular ring $A^4$, as seen in Fig. 2.

B represents a sleeve which might be called the "hub" of the wheel. This sleeve is of a solid cylindrical form with a central opening $B^0$ for the axle C, and has a larger portion B' of approximately the same or of a slightly smaller width than the width of the annular ring $A^4$ and a reduced portion $B^2$, which extends inwardly beyond the inner edge of the annular ring $A^4$ and is held upon the axle by a pin or key b' passing through this reduced portion of the sleeve B and through the axle C, as seen in Fig. 2.

The larger portion B' of the sleeve B has an external groove $b^0$ formed centrally around its periphery and coincident with the groove $a^0$ in the annular ring $A^4$, and in these grooves antifriction-balls D are fitted to form a bearing between the wheel and the said sleeve. These antifriction-balls D are placed in position through a circular radial opening $e^0$ in the sleeve B, into which opening is afterward fitted a circular plug E, having concaved ends to correspond with the contour of the surfaces of the central opening $B^0$ and the peripheral groove $b^0$, respectively. This plug is held in position by means of a pin or key E', which passes through the sleeve B and through the plug E, as shown.

In use the sleeve B is fitted upon the axle in such a way that the plug E will always be uppermost, so that the portion of the groove in the sleeve where there will be the most friction will be perfectly even and smooth and so that no injurious effects can arise from the uneven wear that would be certain to occur should any great amount of friction occur at the end of the plug E, which would create a jarring that would increase more rapidly as the wheel was caused to rotate.

A plate F, having a central opening $F^0$, is fitted over the radial portion of the sleeve B, and is secured to the inner side of the annular ring $A^4$ by means of screws *f* to protect the bearings from dust, moisture, and other injurious elements. Another circular plate F' is fitted over the outer end of the axle and sleeve and is secured to the outer side of the annular ring $A^4$ by means of screws *f*, in like manner as the plate F', above described, to further exclude dust and moisture from the antifriction-balls D. A central opening $f^0$ is provided in the plate F' for the introduction of oil to the bearings, and this opening is fitted with a screw-plug *f'*, which normally closes this opening. The oil will run around in the space between the periphery of the hub and the inner face of the ring $A^4$, and will thus keep the balls well lubricated.

Instead of a thumb-screw *f'* (shown in Figs. 1 and 2) I may, if preferred, provide a spring-plate P, pivoted at *p* upon the circular outer plate F, for closing the oil-opening $f^0$, as shown in Figs. 3 and 4.

The various advantages of my improved wheel will be obvious to any mechanical mind and need not be dwelt upon herein.

Having thus described my invention, what I claim, and desire to secure by Letters Patent of the United States, is—

1. In a car-wheel, the combination with a circular sleeve provided with a central opening for the axle, having a shallow groove around its periphery, and an opening therein leading to said peripheral groove; a plug having one end shaped to correspond with the contour of the surface of said groove, adapted to close said opening, and means for holding said plug immovably in said opening; of a wheel provided with a tread-ring and having a web provided with a circular central opening of an interior diameter slightly greater than the exterior diameter of said sleeve, and said web having a shallow groove formed therein around the interior of said opening; antifriction-balls fitting in said grooves in the web and sleeve; circular plates secured to the opposite faces of said web, and one of said plates having an opening therein for admitting oil to said balls; and means for closing said oil-openings, substantially as described.

2. In a car-wheel, the combination with a circular sleeve provided with a central opening for the axle, having a shallow groove around its periphery, and an opening therein leading to said peripheral groove; a plug having one end shaped to correspond with the contour of the surface of said groove, adapted to close said opening, and means for holding said plug immovably in said opening; of a wheel provided with a tread-ring and having a comparatively thin web provided with a circular central opening therein and a thickened annular portion around said opening, the length of that portion of the radius of said web from the central opening therein to the inner circumference of the tread-ring being considerably greater than the length of the radius of said sleeve, and the interior diameter of said central opening being slightly greater than the exterior diameter of said sleeve; and said web having a shallow groove formed therein around the interior of said opening; antifriction-balls fitting in said grooves in the web and sleeve; circular plates secured to the opposite sides of the annular thickened portion of said web, and one of said plates having an opening therein for admitting oil to said balls; and means for closing said oil-opening, substantially as described.

In testimony whereof I affix my signature in presence of two witnesses.

JOHN T. JONES.

Witnesses:
E. A. WOODWARD,
ALVIN POE.